US007003494B2

(12) United States Patent
Beach et al.

(10) Patent No.: US 7,003,494 B2
(45) Date of Patent: Feb. 21, 2006

(54) PREPROCESSOR SYSTEM AND METHOD FOR REJECTION OF DUPLICATE INVOICES

(75) Inventors: Michael W. Beach, Endicott, NY (US); Gerald D. Bucinell, Vestal, NY (US); Lawrence J. Cartin, Endwell, NY (US); Louis M. Ciotoli, Endicott, NY (US); Theodore W. Fedorchak, Endwell, NY (US); Robert P. Hughes, Waverly, NY (US); Eileen L. Mosher, Binghamton, NY (US); Julie M. Murphy, Vestal, NY (US); Scotty J. Reynolds, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 09/244,304

(22) Filed: Feb. 3, 1999

(65) Prior Publication Data
US 2001/0014880 A1 Aug. 16, 2001

(51) Int. Cl.
*G06F 17/60* (2006.01)
(52) U.S. Cl. .............................. 705/40; 705/35; 705/34; 705/39; 705/37
(58) Field of Classification Search ................... 705/30, 705/33, 45, 35–40; 707/101
See application file for complete search history.

(56) References Cited

U.S. PATENT DOCUMENTS

| | | | | |
|---|---|---|---|---|
| 5,111,395 A | * | 5/1992 | Smith et al. .................... 705/45 |
| 5,151,948 A | * | 9/1992 | Lyke et al. .................. 382/138 |
| 5,357,629 A | | 10/1994 | Dinnis et al. ............... 395/600 |
| 5,550,734 A | | 8/1996 | Tarter et al. ............ 364/401 R |
| 5,675,780 A | * | 10/1997 | Plant-Mason et al. .......... 707/6 |
| 5,680,611 A | * | 10/1997 | Rail et al. .................... 707/101 |
| 5,845,285 A | * | 12/1998 | Klein .......................... 707/101 |
| 5,899,981 A | * | 5/1999 | Taylor .......................... 705/30 |
| 5,918,216 A | * | 6/1999 | Miksovsky et al. ............ 705/35 |
| 5,930,778 A | * | 7/1999 | Geer ............................. 705/45 |
| 6,035,295 A | * | 3/2000 | Klein ............................. 707/6 |
| 6,058,380 A | * | 5/2000 | Anderson et al. ............. 705/40 |
| 6,381,587 B1 | * | 4/2002 | Guzelsu ........................ 705/40 |
| 6,507,826 B1 | * | 1/2003 | Maners ......................... 705/34 |

FOREIGN PATENT DOCUMENTS

JP 410143540 A * 5/1998

OTHER PUBLICATIONS

PR Newswire "CINCOM Announces Accounts Payable Module" Jul., 1985.*
Hewlett-Packard Co. "MCBA Accounts Payable System—HP-UX Documentation Disk HP LaserROM Part No. 50726-10186", *Software Patent Institute Database of Software Technologies*, S/N HPAPPS.0149, (c) 1981-1993 by HP Corp., Feb. 1, 1995.

* cited by examiner

*Primary Examiner*—Vincent Millin
*Assistant Examiner*—Narayanswamy Subramanian
(74) *Attorney, Agent, or Firm*—William E. Schiesser; Shelley M Beckstrand (57) ABSTRACT

An accounts payable system in which invoices submitted by electronic data interchange (EDI) are audited for duplicate invoices prior to them being entered into the production database, or environment. Pre-processor logic audits, identifies and returns electronically duplicate transmissions. At this pre-processor level, all inbound invoices are sorted in credit/debit sequence. Invoices are posted (committed to the production accounts payable environment; that is, to the accounts payable data base) one at a time so purchase order history is current for each evaluation. Inbound invoices are sorted by credit/debit. Only debits are audited.

8 Claims, 4 Drawing Sheets

PREPROCESSOR SYSTEM AND METHOD FOR REJECTION OF DUPLICATE INVOICES

BACKGROUND OF THE INVENTION

1. Technical Field of the Invention

This invention pertains to an account payable system. More particularly, it relates to an account payable system in which duplicate invoices are identified during preprocessing, thus preventing introduction of duplicate invoices into the accounts payable data base and substantially avoiding manual processing.

2. Background Art

Trading partners (also referred to as vendors) submitting invoices to a SAP (accounts payable) installation often send in duplicate files, causing the accounts payable center a great deal of analysis and time to manually delete these duplicates from the production system (also referred to as the accounts payable data base).

Consequently, there is a need in the art for a system and method for avoiding much, if not all, such manual processing.

It is an object of the invention to provide an improved accounts payable system and method.

It is a further object of the invention to provide an improved accounts payable system and method in which manual deletion of duplicate files is substantially eliminated.

It is a further object of the invention to provide an improved accounts payable system and method in which duplicate invoices (input files) are identified during preprocessing to avoid introduction of duplicate invoices into the accounts payable database.

SUMMARY OF THE INVENTION

In accordance with the invention, there is provided an accounts payable system and method. Electronic invoices received from a vendor are preprocessed to identify duplicate invoices. Invoices not identified as duplicate invoices are introduced into an accounts payable data base for payment while invoices identified as duplicate invoices are rejected back to the vendor without being introduced into the accounts payable data base for payment.

Other features and advantages of this invention will become apparent from the following detailed description of the presently preferred embodiment of the invention, taken in conjunction with the accompanying drawings.

BEST MODE FOR CARRYING OUT THE INVENTION

Acronyms; Abbreviations; Function, Procedure and Variable Names and Definitions
(Most of these abbreviations are not intuitive in English inasmuch as they were derived from German language phrases. The code in Table 1 is written in the syntax of the ABAP/4 language, and has a syntax similar to that of SQL or the IBM DB/2 relational database language.)

Figures 3, 3A:
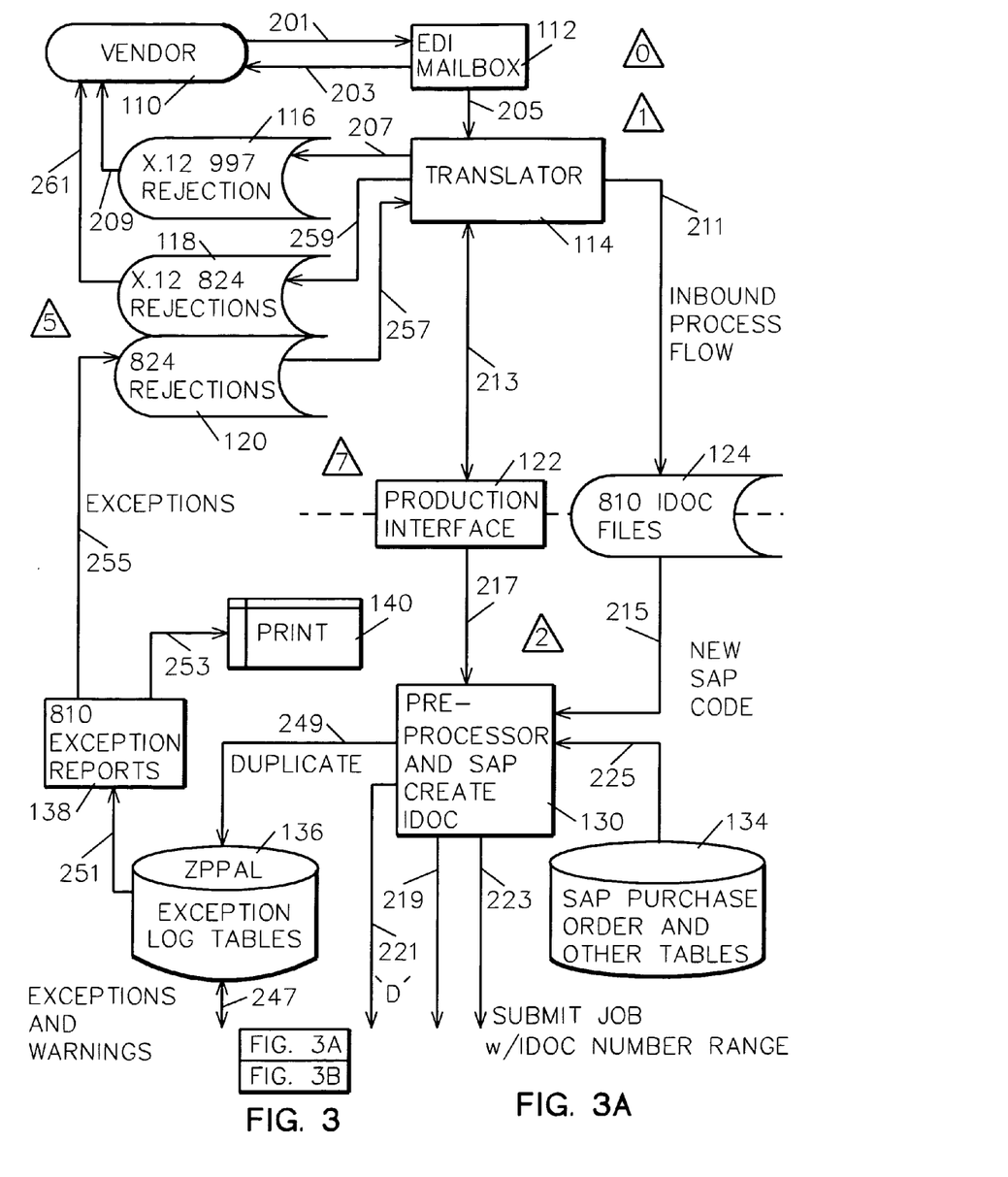
FIGS. 3A and 3B, arranged as shown in FIG. 3, illustrate a flow diagram of the system of the invention.
Figure 3B:
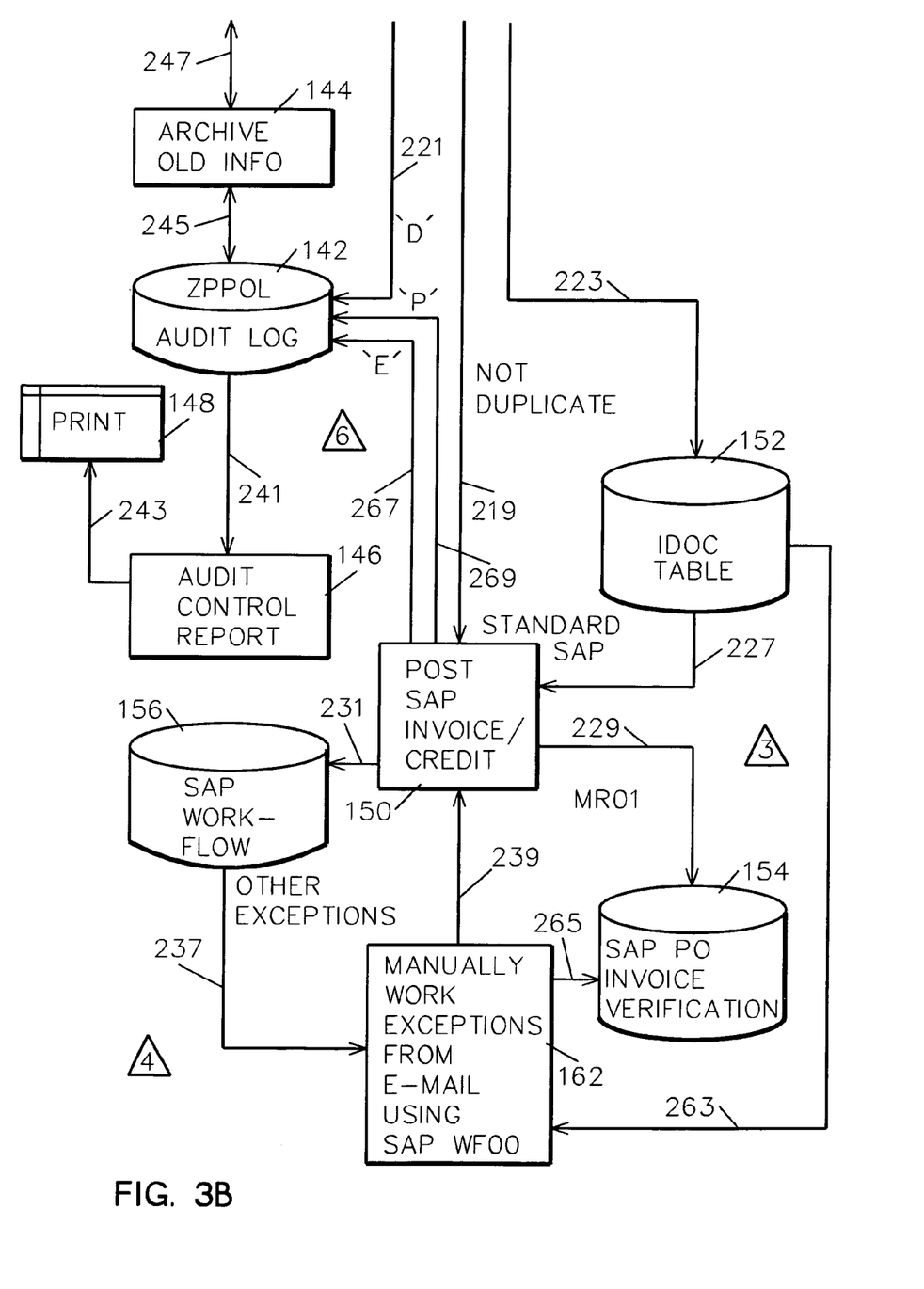

| | |
|---|---|
| AMT | Amount. |
| BSAK | Cleared invoices. |
| BELNR | SAP document number. |
| BELNR-LOW | ⎤ These three variable names are used to |
| BELNR-SIGN | ⎟ fetch a list of documents from the |
| BELNR-OPTION | ⎦ purchase order history, a table of invoices that have the same vendor invoice number. |
| BSIK | Open invoices. |
| CHECK | An ABAP/4 verb which checks a condition as true or false; if true, processing continues through the current event (such as a subroutine); if false, processing returns to the place from which this event was called, such as from a PERFORM. |
| CLEAR | An ABAP/4 verb which initializes a variable or data stream to zeros or blanks, etc., depending upon the data type. |
| DESCRIBE | An ABAP/4 verb that means to describe the attributes of data. In the context of this invention (See Table 1, lines 66, 74, 81), the data is a table and the desired attribute is the number of rows in the table. |
| DOCNUM | Location (memory or register) where the IDOC number is stored. |
| DUP | Duplicate. |
| EBELN | Purchase order number. |
| EBELP | Purchase order item (position on purchase order). |
| EDI | Electronic Data Interchange. |
| EDIDC | IDOC control table. |
| EDIDD | IDOC data segment table. |
| EDI_Z51 | An internal table used to hold purchase order items. |
| EKBE | Purchase order history table. |
| EKBE_ITAB | An internal table used to hold purchase order history for one purchase order. |
| EKBE_ITAB-DMBTR | Invoice amount in the purchase order history table. |
| EXIT | An ABAP/4 verb which causes control to return unconditionally to the caller from this subroutine or other event. |
| E1EDP02 | Structure (a list of field names) of the IDOC purchase order item data segment. The IDOC is stored in a table in which each row has two parts: control information, and data segment. |
| IDOC | Intermediate document. An invoice is a kind of IDOC; In FIG. 3, there exist 824 IDOCs 138 and invoice IDOCs 152. |
| IDOC_CONTAINER | An internal table containing all IDOC data segments. |
| IDOC_CONTROL | Holding area (register or field) for IDOC control record. |
| IDOC_PO | Holding area (register or field) for purchase order number. |
| IDOC_PO-EBELN | Another holding area for purchase order number. |
| IDOC_PO-EBELP | Holding area for purchase order item number. |
| INT_ZPPOL | A temporary, internal table resident in memory for the ZPPOL table. |
| ITAB | Used in a table name to designate an internal table corresponding to a SAP physical table. An internal table is a location resident in main memory which is initialized to empty. |
| LIFNR | Vendor number. |
| MESSAGE S070 | An ABAP/4 message verb meaning get message #70, a message which identifies a duplicate invoice exception. |
| PO | Purchase Order |
| PO_HISTORY_AMT | Net amount of credit/debit invoices for a vendor invoice number, purchase order item number combination. |

-continued

Acronyms; Abbreviations; Function, Procedure and Variable
Names and Definitions
(Most of these abbreviations are not intuitive in English
inasmuch as they were derived from German language phrases.
The code in Table 1 is written in the syntax of the ABAP/4
language, and has a syntax similar to that of SQL or the IBM
DB/2 relational database language.)

| | |
|---|---|
| QUALF | Field in memory that contains the qualifier value of an IDOC data segment. |
| REFRESH | An ABAP/4 verb: deletes all rows in an internal table. |
| SAP | System Application and Products for Data Processing (an English language phrase roughly equivalent to the German language phrase from which the acronym is derived). |
| SDATA | Field that contains the IDOC data segment application data. |
| SEGNAM | Segment name: a field that contains the value that identifies the data structure in an IDOC data segment. |
| SELECT | An ABAP/4 verb: get rows out of table. |
| SHKZG | Debit/credit indicator. |
| SNDPRN | Vendor number on IDOC control record. |
| SY | Structure name that contains system values available to the program. |
| SY-DBCNT | Data base count field; used to count number of rows returned from a SELECT from table, or to hold the value of the number of rows in an internal table. |
| SY-SUBRC | Return code (successful or unsuccessful) from a call (SELECT, SEARCH, etc.) |
| VBELN | Vendor's invoice number in ZPPAL table 136 (FIG. 3A) |
| WF00 | SAP transaction for processing workflow processes 162 (FIG. 3B). |
| XBLNR | Vendor's invoice number in SAP financial documents. |
| X.12 | ANSI standard: communications protocol for EDI messages. |
| ZEILE | Purchase order item number field in the IDOC data segment. |
| ZEKKN | Accounting serial number in purchase order history table EKBE, one of tables 134 (FIG. 3A). |
| ZIPRO | The processing status field in audit log table ZPPOL 142 (FIG. 3B). Values include "D" (duplicate), "P" (processed) and "E" (error). |
| ZLGNO | Preprocessor 130 log number; associated with a given file or run number. |
| ZPPAL | Exception log table 136 (FIG. 3A). |
| ZPPOL | Audit log table 142 for auditing results of IDOC processing (the D, P, E entries, supra). |
| ZSQNO | Log sequence number |
| 810 IDOC file | X.12 message identifier for an invoice or billing document. |
| 824 Rejection | Application advice derived from an application program, such as preprocessor 130 or post 150. |
| 997 Rejection | Translator 114 rejection, meaning this X.12 message received from vendor is no good. |
| "_" | The "—" is typically used as a separator between table name and field name, as in: tablename-fieldname and in this respect uses a DB2 or SQL-like syntax. It can also be used instead of an underscore "—" in a variable name. |

In accordance with the preferred embodiment of the invention, an account payable system is provided in which duplicate invoices are identified during preprocessing, thus preventing introduction of duplicate invoices into the accounts payable data base and substantially avoiding manual processing.

In accordance with the preferred embodiment of the invention, invoices submitted such as by electronic data interchange (EDI) to a SAP (accounts payable) installation are audited for duplicate electronic invoices prior to them being entered into the production SAP environment. This is accomplished by building the logic at the pre-processor level to audit, identify and return electronically duplicate transmissions. At the pre-processor level, all inbound invoices are sorted in credit/debit sequence. Invoices are posted (committed to the production SAP environment; that is, to the accounts payable data base) one at a time so purchase order history is current for each evaluation. Inbound invoices are sorted by credit/debit. Only debits are audited for duplicates.

Figure 1:
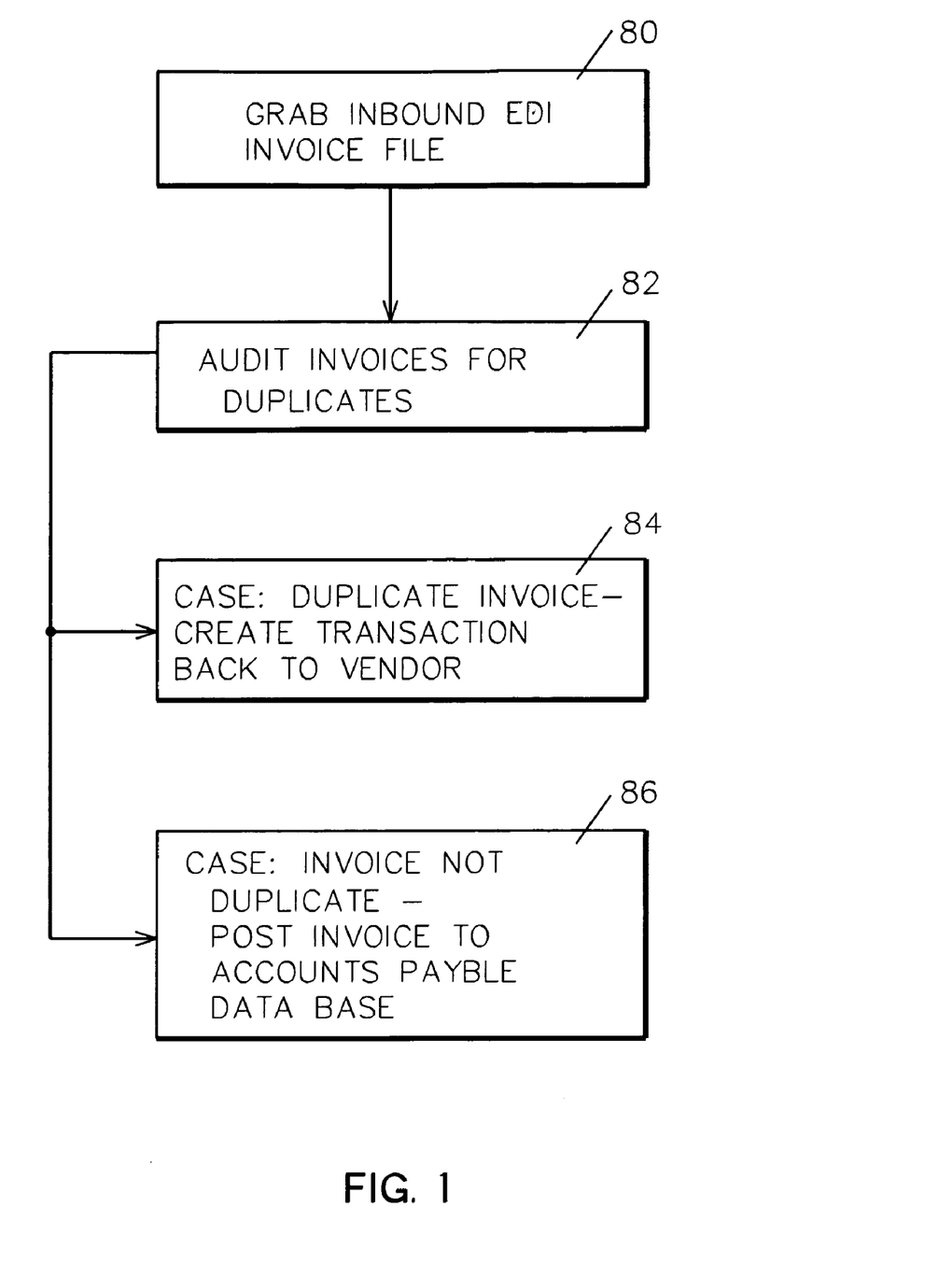
FIG. 1 illustrates a flow diagram of the method of the invention.

Referring to FIG. 1, in accordance with the method of the invention, invoices are added to an accounts payable data base in such a manner as to avoid introducing spurious data to the data base. (1) In step 80, an inbound EDI invoice file is grabbed before it is input to the data base. (2) In step, 82, invoices are audited for duplicates. (3) In step 84, upon determining a duplicate invoice, a transaction back to the vendor is created. And (4) in step 86, posting to the accounts payable data base is done only for invoices determined during auditing not to be duplicates.

Figure 2:
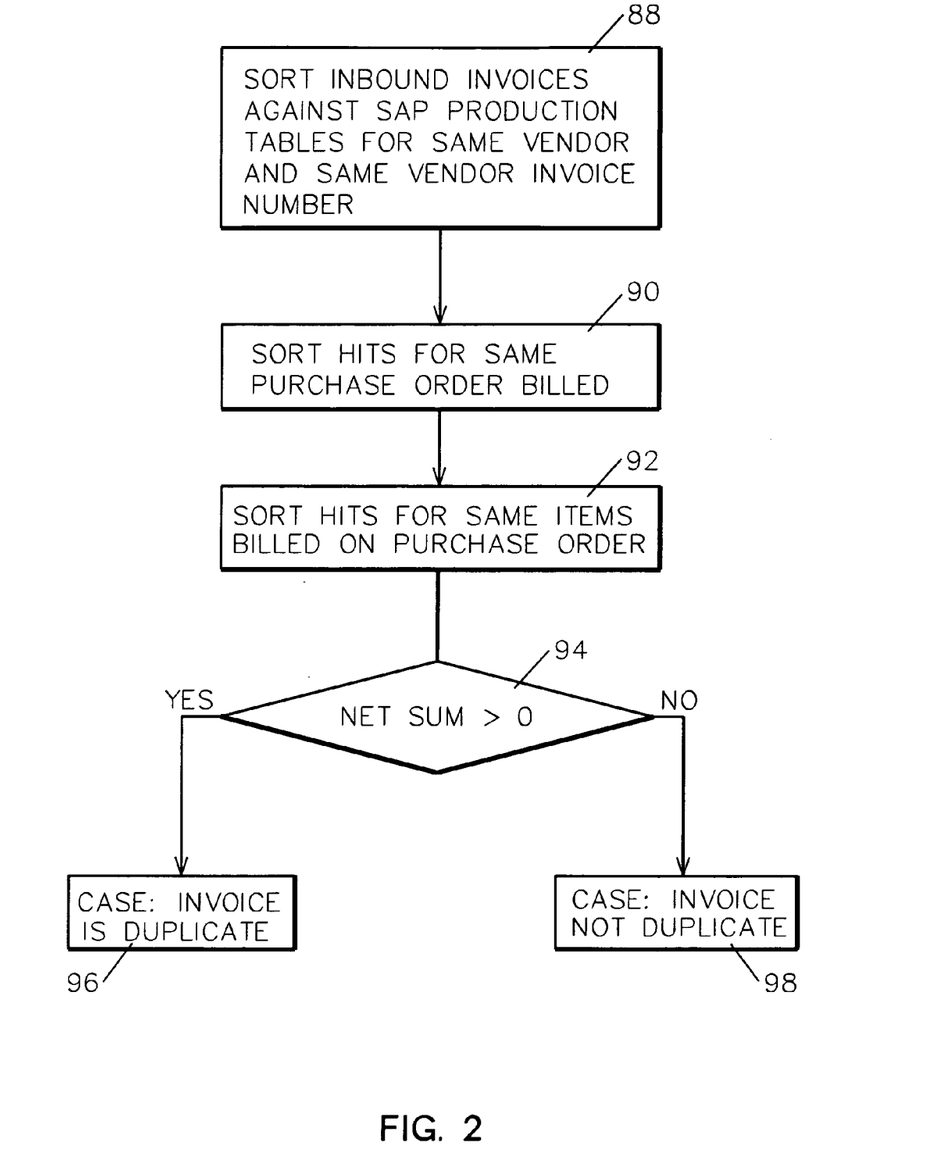
FIG. 2 illustrates a flow diagram of the audit invoices step of FIG. 1.

Referring to FIG. 2, the auditing step 82 includes, in step 88, sorting the inbound invoices against SAP production tables for same vendor and same vendor invoice number; in step 90, sorting hits from step 88 for same purchase order billed; in step 92, sorting hits from step 90 for same items billed on purchase order; and in step 94 sorting hits from step 92 to see if any item identified has a net sum>0. If an item has net sum≦0, it is not a duplicate and is allowed in steps 98 and 86 to be posted to the accounts payable data base. If an item has net sum>0, it is a duplicate, and a transaction back to the vendor is created in steps 96 and 84 to cancel the duplicate invoice.

Referring to FIG. 3, vendor system 110 is connected over lines 201 (for submission of an 810 EDI invoice) and 203 (for receipt of messages back) to EDI mailbox 112. EDI mailbox 112 transmits invoice data to DI translator 114 over interface 205. Translator 114 is connected to production interface 122 and 810 IDOC files 124 as is represented by lines 213 and 211, respectively; receives 824 rejections 120 from 810 exception reports block 138 over lines 255 and 257; and communicates X.12 824 rejections 118 to vendor 110 over lines 259 and 261. Preprocessor 130 is connected to production interface 122 and 810 IDOC files 124 as is represented by lines 217 and 215, respectively. Preprocessor 130 receives data from SAP purchase order and other tables 134 over interface 225; and provides data identifying duplicate invoices over line 249 to exception log tables ZPPAL 136 and over line 221 to audit log ZPPOL 142. Preprocessor 130 creates the SAP IDOC and provides output for purchase orders which are not duplicates over interface 219 to post SAP invoice/credit block 150 and over interface 223 to IDOC table 152. Post block 150 provides output over line 229 to SAP PO invoice verification file 154. Post block 150 provides a processed 'P' message to audit log ZPPOL 142 over line 269 for invoices for which no error has been identified; and an error 'E' message over line 267 for invoices which are not posted due to some processing error. Invoices which are not posted due to some processing error are communicated over line 231 to SAP workflow file 156, and, as is represented by block 162 and lines 237 and 239, these exceptions are manually worked using SAP WF00. Audit control reports 146 are communicated over lines 241 and 243 to print block 148. Old information archive data 144 is communicated over lines 245 and 247 from audit log 142 to exception log tables 247. As is represented by line 251, exceptions and warnings reports 138 are communicated from exception log tables 136 to print block 140 over line 253 or as 824 rejections 120 over lines 255 and 257 to translator 114.

In operation, checkpoints CP0 through CP7 (represented generally by the numbered triangles in FIG. 3), control the EDI process of the preferred embodiment of the invention.

Checkpoint 0: DI set-up and authorization. A vendor 110 who submits and 810 EDI invoice over line 210 to EDI mailbox must be set-up as a trading partner in DI translator 114. In accordance with the preferred embodiment of the invention, a restrictive mailbox 112 is used, and if the account user identifier (ID) is not set-up, the network sends an X.12 997 rejection 116 back to vendor 110 stating that its 810 invoice was undeliverable.

Checkpoint 1: DI translator in/out. A count is maintained of the number of invoices coming into DI translator 114 over line 205, and it must equal the number of invoices that exit DI translator as accepted invoices over line 213 or as rejected invoice records over lines 207 and 259. The dollar count coming into DI translator 114 over interface 205 is taken from the TDS segment of the incoming record.

Checkpoint 2: Pre-processor in/out. Preprocessor 130 completes and validates transactions passed through production interface 122 from DI translator 114. Preprocessor 130 generates audit control log 142 and report 146; preprocessor errors, or exception reports 138 and log 136; calculates line item accounts; deducts sales tax; adds multiple IDOCs to IDOC table 152; and creates the SAP IDOC number.

Checkpoint 3: Post, or create, SAP invoice/credit. Post SAP invoice/credit block ensures that the record and dollar count that exited from DI translator 114 match what is entered into SAP 156.

Checkpoint 4: SAP error queue for exceptions. Exceptions going into an error queue in workflow file 156 are IDOCs that fail SAP audits, such as configuration problems. Workflow file 156 contains exception messages for failed IDOCs that are handled via workflow processes. That is, when an IDOC fails it is put in a work queue. A workflow process is a job that controls what will happen with that failed IDOC. In this case, the failed IDOC message is placed in a queue and a corresponding workflow task is sent to an SAP user id. The recipient at that user ID retrieves these messages from his mail inbox as is represented by line 237 and handles them one at a time, accessing IDOC table 152 as is represented by line 263 and SAP Wf00 block 162 to again process the IDOC and determine why the IDOC failed (see what error messages they get.)

Checkpoint 5: Pre-processor exceptions/warnings. Exceptions added to log tables 136 are IDOCs which become errors (representing duplicate invoices) as a result of the audit by preprocessor 130. Warnings added to log tables 136 represent IDOCs where preprocessor 130 recalculates an invoice, deducts sales tax, or adds multiple IDOCs. A report 140 is generated showing rejection transactions, where preprocessor 130 errors successfully resulted in an 824 rejection message 118, 120 being sent to vendor 110.

Checkpoint 6: Archive old information. Exception log tables 136 and audit log tables 142 are archived to block 144 at predefined intervals. A report shows the range of dates that are archived, and the date of archival.

Checkpoint 7: Production/Procurement interface. Production interface 122, in this preferred embodiment of the invention, interfaces the MVS environment (above interface 122) to the AIX environment (below interface 122).

Referring to Table 1, the processing which occurs in preprocessor 130 is described in further detail. The code is in the syntax of the ABAP/4 language, which has a syntax similar to that of the SQL language.

In Table 1, lines 1–13 are the main routine for processing IDOCs that are created and for calling the duplicate invoice check routine. The flag at line 8 indicates whether or not a duplicate invoice has been found. At line 9, if this invoice is a debit invoice, then the duplicate invoice check starting at line 16 is called. Upon returning from the duplicate invoice check, processing drops down to line 13 where the duplicate invoice flag is checked and, if the flag indicates the invoice is ok, processing leaves the code of Table 1 and picks up in code (not shown) executed within post block 150 (FIG. 3B). (If the duplicate invoice check at line 13 shows duplicate 'D' status, then the duplicate check routine below line 14 will have already posted the error and sent the error message back to the vendor.) Refer to the schedule of abbreviations, supra, for a description of each data and variable name.

In Table 1, lines 16 to 125 are the duplicate invoice check routine executed within preprocessor 130. In this routine, CHECK verbs are executed at lines 23, 67, 75, 82 and 89, representing the five checks comprising duplicate invoice checking in accordance with the preferred embodiment of the invention. In the logic of this embodiment of the invention, if any CHECK fails, then the invoice is not a duplicate, and execution returns to main routine at lines 1–14.

In Table 1, lines 15–23, the return code from exception log table ZPPAL 136 is tested. The CHECK at line 23 checks the return code, which is never expected to fail, and processing continues to line 27.

In Table 1, lines 24–67, all open and closed invoices for this vendor's invoice number are selected (see lines 45 and 56). If none are found, no checking is to be done, and the CHECK at line 67 will return control to the main routine. At line 27 this vendor is checked to see if it is identified as one for which duplicate invoice checking is to be performed.

In Table 1, lines 68–75, the list of vendor invoice numbers determined previously to match the one we are checking is examined to see if there has been any previous related purchase orders. That is, is there a PO history. If there is none, then an exit from the duplicate invoice check subroutine occurs at the CHECK at line 75.

In Table 1, lines 76–82, determines if any purchase order item IDOC data segments have been identified. The CHECK at line determines if any purchase order item IDOC data segments have been identified. The result is always expected to be true, and processing continues.

In Table 1, lines 83–89, the final check is performed. This routine determines, for each item on the invoice, the sum of its purchase order history (having the same vendor's invoice number as the one being checked). If an item has a purchase order history greater than zero, the CHECK at line 89 rejects this purchase order as a duplicate.

In Table 1, lines 91 to 125, the result of duplicate invoice checking is logged to ZPPOL log 142 and ZPPAL log 136, and status is logged to IDOC table 152.

In Table 1, lines 127 to 193, several subroutines called by PERFORM verbs from the duplicate invoice checking process are set forth. FORM BUILD_EKBE_ITAB_TABLE, at lines 127–137, is the subroutine called by the PERFORM at line 73 that obtains the purchase order history for invoices that have a vendor invoice number equal to the invoice number being checked. FORM BUILD_IDOC_PO_TABLE, at lines 138 to 175, is the subroutine called by the PERFORM at lin 80 that reads in IDOC segments and gets every unique purchase order/item number combination, and generates the list of purchase order items of interest. FORM TEST_PO_HIST_WITH_PO_ITEMS, at lines 176 to 193, is the subroutine called by the PERFORM at line 88 that sums the net purchase order history amount for every purchase order item on the invoice being checked; if it finds an item with an amount greater than zero, the routine exits back to the PERFORM (line 88) and quits checking.

TABLE 1

DEBIT INVOICES DUPLICATE CHECKING

```
1   *
2   * Debit invoices duplicate checking
3   *
4   DATA:DUP_INVOICE(1).
5   *
6   * Contained in form process-zppol (Table 142, FIG. 3B)
7   *
8   DUP_INVOICE = SPACE.
9   IF INT-ZPPOL-CREDIT_DEBIT = 'D'.
10      PERFORM DUP_INVOICE_CHECK.
11      CLEAR ZPPAL.
12  ENDIF.
13  CHECK DUP_INVOICE=SPACE.
14  *
15  *
16  FORM DUP_INVOICE_CHECK.
17  *
18  * Break-point
19  *
20  SELECT SINGLE* FROM ZPPAL WHERE
21      ZLGNO = INT_ZPPOL-ZLGNO AND
22      ZSQNO = INT-ZPPOL-ZSQNO.
23  CHECK SY-SUBRC=00.
24  *
25  * Is the vendor to be dup invoice checked?
26  *
27  IF ZPPAL-SNDPRN IN SNDPRN.
28  *
29  * Next sentence
30  *
31  ELSE.
32      EXIT.
33  ENDIF.
34  *
35  * Get all invoice numbers with same vendor
36  * invoice number to be used later for
37  * summing po-history by vendor invoice number.
38  *
39  * Check open documents
40  *
41  CLEAR BELNR.
42  REFRESH BELNR.
43  *
44  *
45  SELECT* FROM BSIK WHERE
46          LIFNR = ZPPAL-SNDPRN AND
47          XBLNR = ZPPAL-VBELN(16).
48      BELNR-LOW = BSIK-BELNR.
49      BELNR-SIGN = '1'.
50      BELNR-OPTION = 'EQ'.
51      APPEND BELNR.
52  ENDSELECT.
53  *
54  * Check closed documents.
55  *
56  SELECT* FROM BSAK WHERE
57          LIFNR = ZPPAL-SNDPRN AND
58          XBLNR = ZPPAL-VBELN(16).
59      BELNR-LOW = BSAK-BELNR.
60      BELNR-SIGN = '1'.
61      BELNR-OPTION = 'EQ'.
62      APPEND BELNR.
63  ENDSELECT.
64  *
65  *
66  DESCRIBE TABLE BELNR LINES SY-DBCNT.
67  CHECK SY-DBCNT>0.
68  *
69  * Does any PO history exist for the
70  * PO on the idoc with invoices in the
71  * above BELNR ranges table?
72  *
```

TABLE 1-continued

DEBIT INVOICES DUPLICATE CHECKING

```
73   PERFORM BUILD_EKBE_ITAB_TABLE.
74   DESCRIBE TABLE EKBE_ITAB LINES SY-DBCNT.
75   CHECK SY-DBCNT>0.
76   *
77   * Fetch PO-item list from the idoc.
78   *
79   INTERMEDIATE_DOCUMENT_NUMBER = INT_ZPPOL-DOCNUM.
80   PERFORM BUILD IDOC_PO_TABLE.
81   DESCRIBE TABLE IDOC_PO LINES SY-DBCNT.
82   CHECK SY-DBCNT>0.
83   *
84   * Does at least one PO-Item on the idoc
85   * have a net PO history > zero?
86   *
87   CLEAR PO_HISTORY_AMT.
88   PERFORM TEST_PO_HIST_WITH_PO_ITEMS.
89   CHECK PO_HISTORY_AMT>0.
90   *
91   * If all the above tests were true then the
92   * invoice is a duplicate.
93   *
94   MESSAGE S070 WITH ZPPAL-VBELN(16) IDOC_POK-EBELN.
95   SKIP.
96   WRITE:/'Dup Invoice:',
97           'idoc'       ,INT_ZPPOL-DOCNUM,
98           'PO-Item'    ,IDOC_PO-EBELN,IDOC_PO-EBELP,
99           'Hist-Amt'   ,PO_HISTORY_AMT,
100          ''.
101  WRITE:/'    Vendor', ZPPAL-SNDPRN,
102          'Vendor-InvNo', ZPPAL-VBELN,
103          ''.
104  PERFORM FORMAT-MESSAGE
105          USING 070 '|' ZPPAL-VBELN(16)
106                      IDOC_PO-EBELN        '''.
107  UPDATE ZPPAL.
108  ZPPOL-ZIPRO = 'D'.
109  UPDATE ZPPOL.
110  PERFORM STATUS_DUP_INVOICE.         "Update idoc status
111  COMMIT WORK.
112     CALL FUNCTION 'EDI_DOCUMENT_CLOSE_PROCESS'
113         EXPORTING
114             DOCUMENT NUMBER = INTERMEDIATE_DOCUMENT_NUMBER
115         IMPORTING
116             IDOC_CONTROL = EDIDC
117         EXCEPTIONS
118             DOCUMENT_NOT_OPEN       = 01
119             FAILURE_IN_DB_WRITE     = 02
120             PARAMETER_ERROR         = 03
121             STATUS_SET_MISSING      = 04.
122  CLEAR ZPPAL.
123  CLEAR ZPPOL.
124  DUP_INVOICE = 'X'.
125  ENDFORM." DUP_INVOICE_CHECK.
126  *EJECT
127  FORM BUILD_EKBE_ITAB_TABLE.
128  CLEAR EKBE_ITAB.
129  REFRESH EKBE_ITAB.
130  SELECT *FROM EKBE INTO TABLE EKBE_ITAB WHERE
131         EBELN = INT_ZPPOL-EBELN       AND
132         ZEKKN > 0                     AND
133         BELNR IN BELNR.
134  SORT EKBE_ITAB BY EBELN EBELP.
135  ENDFORM." BUILD_EKBE_ITAB_TABLE.
136  *
137  *
138  FORM BUILD_IDOC_PO_TABLE.
139     CALL FUNCTION 'EDI_DOCUMENT_OPEN_FOR_PROCESS'
140         EXPORTING
141             DOCUMENT_NUMBER = INTERMEDIATE_DOCUMENT_NUMBER
142         IMPORTING
143             IDOC_CONTROL = EDIDC
144         EXCEPTIONS
145             DOCUMENT_FOREIGN_LOCK      = 01
146             DOCUMENT_NOT_EXIST         = 02
147             DOCUMENT_NUMBER_INVALID    = 03.
148     CHECK SY-SUBRC = 00.
149  CLEAR IPOC_PO.
```

TABLE 1-continued

DEBIT INVOICES DUPLICATE CHECKING

```
150    REFRESH IDOC_PO.
151    DO.
152        CALL FUNCTION 'DIC_SEGMENT_GET_NEXT'
153            EXPORTING
154                DOCUMENT_NUMBER = INTERMEDIATE_DOCUMENT_NUMBER
155            IMPORTING
156                IDOC_CONTAINER = EDIDD
157            EXCEPTIONS
158                DOCUMENT_NUMBER_INVALID        = 01
159                END_OF_DOCUMENT                = 02.
160        IF SY-SUBRC <> 00. EXIT.ENDIF."at end exit do loop
161    *** if edidd-segnam = 'EDI_Z51'.
162    ***   move z51_rec-ordnr to idoc_po_ebeln.
163    ***   move z51_rec-orpnr to idoc po-ebelp.
164        IF EDIDD-SEGNAM = 'E1EDP02'.
165            MOVE EDIDD-SDATA     TO E1EDP02.
166            IF E1EDP02-QUALF = '001'.
167                MOVE E1EDP02-BELNR TO IDOC_PO-EBELN.
168                MOVE E1EDP02-ZEILE TO IDOC_PO-EBELP.
169                APPEND IDOC_PO.
170            ENDIF.
171        ENDIF.
172    ENDDO.
173    SORT IDOC_PO BY EBELN EBELP.
174    ENDFORM." BUILD_IDOC_PO_TABLE.
175    *-----------------------------------------------------------*
176    FORM TEST_PO_HIST_WITH_PO_ITEMS.
177    LOOP AT IDOC_PO.
178        CLEAR PO_HISTORY_AMT.
179        LOOP AT EKBE_ITAB WHERE
180            EBELP = IDOC_PO-EBELP.
181            IF EKBE_ITAB-SHKZG _ 'H'.
182                PO_HISTORY_AMT =
183                PO_HISTORY_AMT + (EKBE_ITAB_DMBTR*-1).
184            ELSE.
185                PO_HISTORY_AMT =
186                PO_HISTORY_AMT + EKBE_ITAB_DMBTR.
187            ENDIF.
188        ENDLOOP. "AT EKBE_ITAB WHERE
189        IF PO_HISTORY_AMT>0.
190            EXIT.
191        ENDIF.
192    ENDLOOP." IDOC_PO.
193    ENDFORM." TEST_PO_HIST_WITH_PO_ITEMS.
```

Advantages over the Prior Art

It is an advantage of the invention that there is provided an improved accounts payable system and method.

It is an advantage of the invention that there is provided an improved accounts payable system and method in which manual deletion of duplicate files is substantially eliminated.

It is an advantage of the invention that there is provided an improved accounts payable system and method in which duplicate invoices (input files) are identified during preprocessing to avoid introduction of duplicate invoices into the accounts payable database.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

The invention claimed is:

1. Method for operating an account payable computing system, comprising:
    preprocessing before introduction into an accounts payable data base original electronic invoices received from a vendor to identify duplicate invoices, including:
        identifying invoices having a same vendor invoice designation, same purchase order number, and same item number;
        calculating a net sum amount of items on invoices identified as having said same vendor invoice designation, said same purchase order number, and said same item number;
        identifying as a duplicate invoice an original electronic invoice for which said net sum amount is greater than zero;
    automatically communicating a duplicate invoice rejection transaction back to said vendor for said, original electronic invoice identified as a duplicate invoice without posting said original electronic invoice to said accounts payable data base; and introducing said original electronic invoices not identified as duplicate invoices into said accounts payable data base.

2. The method of claim 1, said preprocessing including
first sorting said original electronic invoice against an accounts payable production table for same vendor and same vendor invoice number;
second sorting hits from said first sorting for same purchase order billed;
third sorting hits from said second sorting for same items billed on purchase order;
calculating a net sum amount of said same items; and
rejecting back to said customer as a duplicate invoice said original electronic invoice if it contains said item with a net sum amount greater than zero.

3. A computing system, comprising:
an accounts payable data base;
a preprocessor for identifying duplicate invoices from among electronic invoices received from a vendor before introducing said electronic invoices into said accounts payable data base by:
identifying electronic invoices having a same vendor invoice designation, same purchase order number, and same item number;
calculating a net sum amount of items on invoices identified as having said same vendor invoice designation, said same purchase order number, and said same item number;
identifying as a duplicate invoice an original electronic invoice for which said net sum amount is greater than zero;
an invoice processor for selectively automatically communicating a duplicate invoice rejection transaction back to said vendor for said original electronic invoice identified as a duplicate invoice without posting said original electronic invoice to said accounts payable data base and introducing said original electronic invoice not identified as said duplicate invoice into said accounts payable data base.

4. A program storage device tangibly embodying a program of instructions for controlling the operation of a computing system responsive to receipt of an electronic input invoice from a vendor according to a method comprising:
preprocessing before introduction into an accounts payable data base original electronic invoices received from a vendor to identify duplicate invoices, including:
identifying invoices having a same vendor invoice designation, same purchase order number, and same item number;
calculating a net sum amount of items on invoices identified as having said same vendor invoice designation, said same purchase order number, and said same item numbers;
identifying as a duplicate invoice an original electronic invoice for which said net sum amount is greater than zero;
automatically communicating a duplicate invoice rejection transaction back to said vendor for said original electronic invoice identified as a duplicate invoice without posting said original electronic invoice to said accounts payable data base; and
storing said original electronic invoices not identified as duplicate invoices into said accounts payable data base.

5. Method for operating an accounts payable computing system, comprising:
receiving an original electronic invoice from a vendor;
rejecting original electronic invoices received from vendors not initialized as trading partners, and translating original electronic invoices received from vendors initialized as trading partners;
assuring that during said translating the count of translated invoices rejected and accepted equals the number of original electronic invoices translated, and feeding accepted invoices for preprocessing;
preprocessing invoices accepted for preprocessing as received from a trading partner vendor, said preprocessing selectively validating a transaction, calculating line item accounts, deducting sales tax, and identifying original electronic invoices which are duplicate invoices before introduction into an accounts payable data base, said identifying duplicate invoices including:
sorting all inbound invoices in credit/debit sequence;
auditing only debit invoices one at a time for duplicate invoices and committing to said accounts payable data base only those debit invoice, which are not duplicate invoices;
identifying invoices having a same vendor invoice designation, same purchase order number, and same item number;
calculating a net sum amount of items on invoices identified as having said same vendor invoice designation, said same purchase order number, and said same item number;
identifying as a duplicate invoice an original electronic invoice for which said net sum amount is greater than zero; said identifying including execution of check verbs, each said check verb being satisfied to identify said invoice as a duplicate invoice; said check verbs including determining that this vendor is a vendor for which duplicate invoice checking is to be performed, determining that there is a purchase order history of previous purchase orders for said invoice, and determining for each item on said invoice a sum of its purchase order history, with said sum being greater than zero for at least one said item;
automatically communicating a duplicate invoice rejection transaction back to said vendor for an original electronic invoice identified as a duplicate invoice without posting said original electronic invoice to said accounts payable data base;
posting said invoice to a workflow database and assuring that the number and amount of invoices posted to said workflow database equal the number and amount of translated invoices accepted for preprocessing;
logging to an error queue invoices failing audit for subsequent manual processing;
logging to an exceptions and warnings log table as exceptions invoices which are determined during preprocessing to be duplicate invoices and as warnings invoices which during preprocessing were recalculated or had sales tax deducted;
introducing said original electronic invoices not identified as duplicate invoices into said accounts payable data base.

6. The method of claim 5, said preprocessing including
first sorting said original electronic invoice against an accounts payable production table for same vendor and same vendor invoice number;
second sorting bits from said first sorting for same purchase order billed;

third sorting hits from said second sorting for same items billed on purchase order;

calculating a net sum amount of said same items; and rejecting back to said customer as a duplicate invoice said original electronic invoice if it contains said item with a net sum amount greater than zero.

7. A computing system, comprising:

an accounts payable data base;

a translator for receiving an original electronic invoice from a trading partner and selectively rejecting said original invoice back to said trading partner or accepting said original invoice for further processing;

a preprocessor for identifying duplicate invoices from among electronic invoices accepted for further processing before introducing said electronic invoices into said accounts payable, data base by:

sorting all inbound invoices in credit/debit sequence;

auditing only debit invoices one at a time for duplicate invoices and committing to said accounts payable data base only those debit invoices which are not duplicate invoices;

identifying invoices having a same vendor invoice designation, same purchase order number, and same item number;

calculating a net sum amount of items on invoices identified as having said same vendor invoice designation, said same purchase order number, and said same item number;

identifying as a duplicate invoice an original electronic invoice for which said net sum amount is greater than zero; said identifying including execution of check verbs, each said check verb being satisfied to identify said invoice, as a duplicate invoice; said check verbs including determining that this vendor is a vendor for which duplicate invoice checking is to be performed, determining that there is a purchase order history of previous purchase orders for said invoice, and determining for each item on said invoice a sum of its purchase order history, with said Bum being greater than zero for at least one said item;

an invoice processor for selectively automatically communicating a duplicate invoice rejection transaction back to said vendor for said original electronic invoice identified as a duplicate invoice without posting said original electronic invoice to said accounts payable data base and introducing said original electronic invoice not identified as said duplicate invoice into said accounts payable data base.

8. A program storage device readable by a machine, tangibly embodying a program of instructions executable by a machine to perform a method for operating a computing system responsive to receipt of an electronic input invoice from a vendor for selectively rejecting back to said vendor duplicate invoices without logging said duplicate invoices to an accounts payable database, said method comprising:

receiving an original electronic invoice from a vendor;

rejecting original electronic invoices received from vendors not initialized as trading partners, and translating original electronic invoices received from vendors initialized as trading partners;

assuring that during said translating the count of translated invoices rejected and accepted equals the number of original electronic invoices translated, and feeding accepted invoices for preprocessing;

preprocessing invoices accepted for preprocessing as received from a trading partner vendor, said preprocessing selectively validating a transaction, calculating line item accounts, deducting sales tax, and identifying original electronic invoices which are duplicate invoices before introduction into an accounts payable data base, said identifying duplicate invoices including:

sorting all inbound invoices in credit/debit sequence;

auditing only debit invoices one at a time for duplicate invoices and committing to said accounts payable data base only those debit invoices which are not duplicate invoices;

identifying invoices having a same vendor invoice designation, same purchase order number, and same item number;

calculating a net sum amount of items on invoices identified as having said same vendor invoice designation, said same purchase order number, and said same item number;

identifying as a duplicate invoice an original electronic invoice for which said net sum amount is greater than zero; said identifying including execution of check verbs, each said check verb being satisfied to identify said invoice as a duplicate invoice; said check verbs including determining that this vendor is a vendor for which duplicate invoice checking is to be performed, determining that there is a purchase order history of previous purchase orders for said invoice, and determining for each item on said invoice a sum of its purchase order history, with said sum being greater than zero for at least one said item;

automatically communicating a duplicate invoice rejection transaction back to said vendor for an original electronic invoice identified as a duplicate invoice without posting said original electronic invoice to said accounts payable data base;

posting said invoice to a workflow database and assuring that the number and amount of invoices posted to said workflow database equal the number and amount of translated invoices accepted for preprocessing;

logging to an error queue invoices failing audit for subsequent manual processing;

logging to an exceptions and warnings log table as exceptions invoices which are determined during preprocessing to be duplicate invoices and as warnings invoices which during preprocessing were recalculated or had sales tax deducted;

introducing said original electronic invoices not identified as duplicate invoices into said accounts payable data base.

* * * * *

UNITED STATES PATENT AND TRADEMARK OFFICE
CERTIFICATE OF CORRECTION

| | |
|---|---|
| PATENT NO. | : 7,003,494 B2 |
| APPLICATION NO. | : 09/244304 |
| DATED | : February 21, 2006 |
| INVENTOR(S) | : Beach et al. |

It is certified that error appears in the above-identified patent and that said Letters Patent is hereby corrected as shown below:

Claim 18. A computing system, comprising:

an accounts payable data base;

a translator for receiving an original electronic invoice from a trading partner and selectively rejecting said original invoice back to said trading partner or accepting said original invoice for further processing;

a preprocessor for identifying duplicate invoices from among electronic invoices accepted for further processing before introducing said electronic invoices into said accounts payable data base by:

sorting all inbound invoices in credit/debit sequence;

auditing only debit invoices one at a time for duplicate invoices and committing to said accounts payable data base only those debit invoices which are not duplicate invoices;

identifying invoices having a same vendor invoice designation, same purchase order number, and same item number;

calculating a net sum amount of items on invoices identified as having said same vendor invoice designation, said same purchase order number, and said same item number;

identifying as a duplicate invoice an original electronic invoice for which said net sum amount is greater than zero; said identifying including execution of check verbs, each said check verb being satisfied to identify said invoice as         a duplicate invoice; said check verbs including determining that this vendor is a vendor for which duplicate invoice checking is to be performed, determining that there is a purchase order history of previous purchase orders for said invoice, and determining for each item on said invoice a sum of its purchase order history, with said ~~Burn being~~ <u>sum being</u> greater than zero for at least one said item;

UNITED STATES PATENT AND TRADEMARK OFFICE
CERTIFICATE OF CORRECTION

PATENT NO. : 7,003,494 B2
APPLICATION NO. : 09/244304
DATED : February 21, 2006
INVENTOR(S) : Beach et al.

It is certified that error appears in the above-identified patent and that said Letters Patent is hereby corrected as shown below:

an invoice processor for selectively automatically communicating a duplicate invoice rejection transaction back to said vendor for said original electroic invoice identified as a duplicate invoice without posting said original electronic invoice to said accounts payable data base and introducing said original electronic invoice not identified as said duplicate invoice into said accounts payable data base.

Signed and Sealed this

Twenty-sixth Day of September, 2006

JON W. DUDAS
*Director of the United States Patent and Trademark Office*